United States Patent Office 2,895,965
Patented July 21, 1959

2,895,965

PROCESS FOR THE PRODUCTION OF AMMONIUM COMPOUNDS

Conrad Hans Eugster, Wallisellen, Rolf Denss and Franz Häfliger, Basel, Bruno Hofer, Munchenstein, Rudolf Pfister, Basel, and Markus Zimmermann, Riehen, near Basel, Switzerland, assignors to Geigy Chemical Corporation, New York, N.Y., a corporation of Delaware No Drawing. Application March 25, 1957
Serial No. 647,996

Claims priority, application Switzerland June 14, 1956

5 Claims. (Cl. 260—347.7)

The present invention concerns a process for the production of ammonium compounds of the tetrahydrofurane series which correspond to the general formula:

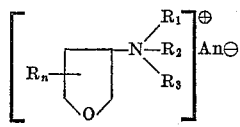

I in which

represents the tetrahydrofuryl radical; $R_n$ represents hydrogen or one or more, identical or different, saturated or unsaturated, aliphatic, cycloaliphatic, araliphatic, aromatic or O-heterocyclic radicals such as e.g. alkyl, alkoxy-alkyl, cycloalkyl, aralkyl or aryl radicals as well as hydroxyalkyl radicals, and it also represents radicals such as acetoxyalkyl radicals, tetrahydropyranyloxyalkyl radicals and alkylidene dioxyalkyl radicals, benzyloxyalkyl radicals, alkanoyl and alkanonyl radicals or alkenyl radicals, which can be converted into the first-enumerated radicals by hydrolysis and/or reduction, hydrogenolysis or hydration; $R_1$ represents an aliphatic, araliphatic or aromatic radical, e.g. a low molecular alkyl or alkenyl radical or an aralkyl or aryl radical; $R_2$ represents an aliphatic radical, e.g. a low molecular alkyl or alkenyl radical and $R_1$ and $R_2$ together with the nitrogen atom represent also an alkylenimino radical with 5-6 ring members or the morpholino radical; $R_3$ represents an aliphatic or araliphatic radical, e.g. an alkyl, carbalkoxyalkyl, alkenyl or aralkyl radical, and An $\ominus$ represents a monovalent anion, in particular that of a halogen hydracid or a normal equivalent of a polyvalent anion.

These compounds have valuable neurophysiological properties. The production thereof is characterised, for example by reacting a tertiary base of the general formula:

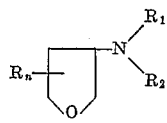

II with a reactive ester of an aliphatic or araliphatic alcohol of the general formula:

$$R_3—An'$$  III wherein $R_n$, $R_1$, $R_2$ and $R_3$ have the meanings given above, and An' represents the acid radical corresponding to the anion of a halogen hydracid, alkylsulphuric acid or arylsulphonic acid, and, if desired, then replacing An'$\ominus$ by another anion.

The tertiary bases can be quaternised in the presence or absence of organic solvents, if necessary while heating. Examples of solvents are diethyl ether, acetone, butanone, ethyl acetate, tetrahydrofurane and benzene. One anion can be exchanged for another for example by double reaction, e.g. an iodide of one of the ammonium bases defined above with a silver salt, e.g. with a silver chloride suspension or a silver nitrate solution. Also solutions of ammonium salts as defined can be reacted with acids or with salts the anions of which form difficultly soluble salts with the quaternary ammonium bases. Finally, a great number of salts are obtained by liberating the base from one of its salts, e.g. by means of an anion exchange resin or by using a halide, e.g. also by means of damp silver oxide and then neutralising the base with any acid desired.

A modification of the production process defined above consists in reacting a tetrahydrofurane of the general formula:

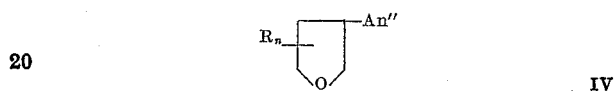

IV in which An" represents a reactive substituent such as e.g. a halogen atom, and $R_n$ has the meaning given above, with a tertiary amine of the general formula:

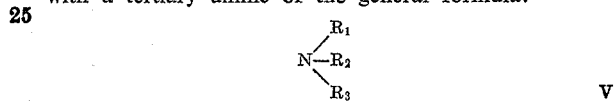

V in which $R_1$, $R_2$ and $R_3$ have the meanings given above, and if desired then replacing the anion An" by another anion.

Finally also a salt, which may be substituted, of a quaternary 2-amino-butane-1.4-diol of the general formula:

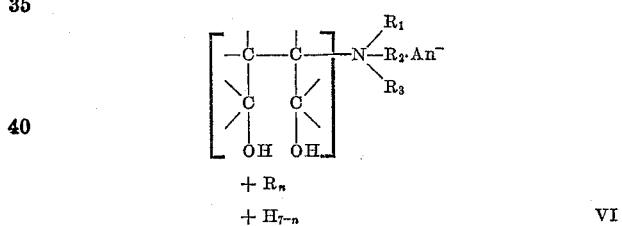

+ $R_n$
+ $H_{7-n}$   VI in which $R_n$, $R_1$, $R_2$, $R_3$ and An$^-$ have the meanings given above, can be converted into quaternary ammonium salts of the general Formula I by means of ring closing agents, in particular phosphoric acid, sulphuric acid or hydrobromic acid, possibly while replacing the anion by that of the ring-closing acid.

The tertiary bases of the general Formula II use as starting materials for the first named production process can be produced for example by reacting a metal compound of propargyl-tetrahydro-pyranyl ether with a carboxylic acid anhydride to form a ($\gamma$-acyl-propargyl)-tetrahydropyranyl ether, adding a secondary amine of the general formula $R_1$—NH—$R_2$ thereto, catalytically hydrogenating the ($\gamma$-acyl-$\beta$-tertiary amino-allyl)-tetrahydropyranyl ether obtained until two mols of hydrogen have been taken up or reducing it in another manner and then treating the $\delta$-substituted ($\delta$-hydroxy-$\beta$-tertiary amino-butyl)-tetrahydropyranyl ether with ring closing agents, e.g. phosphoric acid.

A further production method for suitable starting materials starts from possibly substituted 4.5-dihydrofurane-3-carboxylic acid alkyl esters, the most simple representative of which can be produced according to Korte and Machleidt, B. 88, 1684 (1955), from butyrolactone by condensing with a formic acid ester by means of sodium, reacting the sodium salt of $\alpha$-hydroxymethylene butyrolactone obtained with methanolic hydrochloric acid under inner molecular disproportionation to form 2 - methoxy - tetrahydrofurane-3-carboxylic acid methyl ester and splitting off the methanol by means of sulphuric acid. The 4.5 - dihydrofurane - 3 - carboxylic acid alkyl esters are hydrogenated, converted into their amides or hydrazides and degraded according to Hoffmann or Curtius. The decomposition of the azides with benzyl alcohol and hydrogenolysis of the 3-carbobenzyl-oxy-amino-tetrahydrofuranes obtained to form 3-amino-tetrahydrofuranes which then are converted, particularly by treating with alkylating agents, into N.N-disubstituted 3-amino-tetrahydrofuranes of the general Formula II is preferred. Other methods of producing primary 3-amino-tetrahydrofuranes start from aspartic acid esters which may possibly be C-substituted. These are reduced, for example by means of lithium aluminium hydride to 2-amino-butane-1.4-diols are converted by means of a Grignard reagent into 1.1.4.4-tetrasubstituted 2-amino-butane-1.4-diols; both types of compounds can be modified with ring closing agents, e.g. sulphuric acid, into the desired primary 3-amino-tetrahydrofuranes. If, in the reactions described above, N.N-disubstituted aspartic acid esters are used instead of aspartic acid esters, then after ring closure, tertiary 4-amino-tetrahydrofuranes corresponding to the general Formula II are obtained direct.

Tertiary 3-amino-tetrahydrofuranes of the general Formula II containing a hydroxyalkyl radical or a radical which can be converted into such a radical by hydrogenolysis, are also obtained by ring closure. This is done by condensing benzyloxy - epoxy - alkanes, e.g., benzyl glycide ethers and homologues thereof with acet-o-acetic acid esters, reacting the α-acetyl-γ-benzyloxy-alkyl-butyrolactones obtained with benzene diazonium chloride to form phenylhydrazones of α-oxo-γ-benzyl-oxyalkyl-butyrolactones, reducing the latter e.g. with zinc and formic acid, to α-formyl-amino-γ-benzyloxy-alkyl-butyrolactones, dialkylating these at the nitrogen atom while splitting off the formyl radical, reducing the α - tertiary amino - γ - benzyloxyalkyl - butyrolactones obtained, e.g. with sodium borohydride to the corresponding diols and treating these with ring closing agents, e.g. with sulphuric acid or hydrobromic acid. Depending on the type of benzyloxyalkyl group and the reaction conditions, sometimes 3-tertiary amino-5-hydroxyalkyl-tetrahydrofuranes are obtained direct on ring closure while splitting up the benzyl ether group.

Examples of reactive esters of aliphatic and araliphatic alcohols corresponding to the general Formula III which can be used are halides such as methyl, ethyl, n-propyl, isopropyl, n-butyl, isobutyl, n-amyl, isoamyl, n-hexyl, n-octyl, allyl, crotyl, methallyl chlorides, bromides or iodides; bromacetic acid-methyl ester, -n-propyl ester, -n-butyl ester and -isobutyl ester; dimethyl sulphate and diethyl sulphate, p-toluene sulphonic acid methyl ester, benzyl, p-chlorobenzyl, p-methoxybenzyl, p-methylbenzyl and β-phenylethyl chlorides and bromides and ω-chloro-acetophenone.

3-halogen-tetrahydrofuranes of the general Formula IV for use in the second process for the production of quaternary end products mentioned above, can be obtained by reacting γ.δ-dihalogeno-alkanols with alkalies. The 3 - bromo - tetrahydrofurane obtained from γ.δ-dibromo-butanol is already known. The 3.4-dihalogen butanols are obtained from the corresponding allyl carbinols by adding halogen. The homologous allyl carbinols are obtained e.g. by reacting allyl magnesium halides with suitable aldehydes and ketones, the 3-halogen-tetrahydrofuranes finally obtained from the corresponding carbinols are mono- or di-substituted in the 5-position. 3-halogen-tetrahydrofuranes substituted in the 2-position are obtained for example by using crotyl halides and homologues thereof instead of allyl halides in the Grignard reaction. Methallyl halides and their homologues produce 3-halogen-tetrahydrofuranes with a further substituent in the 3-position, and α-substituted allyl halides produce those having a substituent in the 4-position. By using different types of aldehydes and ketones for the Grignard reaction, the substituent R in the 5-position, which in the following will be referred to as the side chain, can be varied to a great degree.

For example, starting materials having a benzyloxy-alkyl radical as side chain, i.e. a substituent R which if desired can be converted by hydrogenolysis into a hydroxyalkyl radical, are obtained if in the above reaction process, benzyloxy alkanals, e.g. benzyloxy acetaldehyde, is used. From this, by reacting with allyl magnesium halides, addition of halogen and ring closure by means of alkali hydroxides, 3 - halogen - 5 - (benzyloxyalkyl) - tetrahydrofuranes, such as e.g. 3-bromo-5-benzyloxy-methyl-tetrahydrofurane, are produced in the manner described above.

A further group of valuable starting materials which contain a hydroxyl substituted side chain are obtained starting from acetals of vinyl acetaldehyde, e.g. 4.4-diethoxy-1-butene. Bromine is added to this, the γ.δ-dibromo-butyraldehyde is liberated and converted into its sodium bisulphite compound. On treating this with potassium cyanide, the 3 - bromo - 5 - cyano - tetrahydrofurane is obtained direct by way of the cyanhydrine of the aldehyde. 3-bromo-5-cyano-tetrahydrofurane can be reacted with reactive Grignard compounds, e.g. alkyl magnesium halides to form 3-bromo-5-acyl-tetrahydrofuranes. These can be reduced, e.g. with lithium aluminium hydride to form 3-bromo-tetrahydrofuranes with an α-hydroxy substituted side chain, e.g. 3-bromo-5-(α-hydroxy-alkyl)-tetrahydrofuranes. If desired however, also 3-bromo-5-acyl-tetrahydrofuranes can be used direct as starting materials, i.e. they are reacted with tertiary amines.

Other variations are possible with regard to the substitution of the 2-position of the tetrahydrofurane ring by using the known 2.3-dichloro-tetrahydrofurane for the production of starting materials of the general Formula IV as this compound reacts with Grignard compounds while retaining the more inert chlorine atom in the 3-position to form 2-substituted 3-chloro-tetrahydrofuranes. Finally 4 - substituted 3 - halogen - tetrahydrofuranes can be obtained by reacting 3.4-epoxy-tetrahydrofurane, which can be substituted in the 2- or 5-position, with a suitable Grignard compound, and then reacting the 3-hydroxy-tetrahydrofurane obtained which is substituted at least in the 4-position, with an inorganic acid halide.

Suitable tertiary amines of the general Formula V are, for example, trimethylamine, dimethylethylamine, triethylamine, dimethyl-n-butylamine, dimethyl-allylamine, dimethyl-benzylamine, dimethyl-(β-phenyl-ethyl)-amine, N-methyl-pyrrolidine and N-methyl-piperidine.

If the 3-halogen-tetrahydrofuranes, the possibilities for the production of which were discussed in the previous paragraphs are reacted with secondary amines instead of tertiary amines, then starting materials corresponding to the general Formula II for the first process are obtained.

Salts of quaternary 2-ammonio-butane-1.4-diols of the general Formula VI, which may possibly be substituted, are obtained, e.g. by reacting tertiary 2-amino-butane-1.4-diols (possibilities for the production of which have been discussed above) with reactive esters of aliphatic or araliphatic alcohols corresponding to the general Formula III, in particular with alkyl halides, dialkyl sulphates or with possibly substituted benzyl halides.

Possibly the production of the quaternary ammonium compounds of the general Formula I according to the present invention can be followed by a modification to form other compounds falling under this general formula. One or more of the radicals R, $R_1$, $R_2$ and $R_3$ can be unsaturated aliphatic, cycloaliphatic or araliphatic radicals which can be converted, if desired, by hydrogenation into the corresponding saturated radicals. Compounds which contain one or more radicals R which can be converted into hydroxyalkyl radicals, can be converted into compounds having a hydroxyalkyl substituted tetrahydrofurane ring by a reaction corresponding to the R radical(s) present. Acyloxyalkyl substituted compounds in particular are hydrolysed alkaline and compounds substituted by tetrahydropyranyloxyalkyl or alkylidendioxyalkyl radicals are hydrolysed acid. Hydrogenolysis of benzyloxyalkyl radicals with catalytically activated hydrogen is performed, if desired in the same step as the hydrogenation of a dihydrofurane ring according to the third production process mentioned, or is performed following a quaternisation according to the first or second production process or is done following the ring closing reaction according to the fourth production process. Alkanoyl substituted compounds contain a keto group in the neighbouring position to the tetrahydrofurane ring and in alkanonyl substituted compounds this group is within an alkyl radical but separate from the ring; both types of compounds can be converted by reduction or hydrogenation, possibly in the same step as the hydrogenation of a dihydrofurane ring, into hydroxyalkyl substituted compounds.

Ammonium salts of the general Formula I ($R_n$=hydrogen) or their fundamental compounds, quaternary ammonium bases, which are not substituted further in the tetrahydrofurane ring are present naturally in two enantiomorphous forms; introduction of a substituent in the tetrahydrofurane ring results in the appearance of two stereoisomeric pairs with different physical properties.

In reactions at asymmetric centres the ratio of amounts of the stereoisomers obtained can be influenced by the reaction conditions. In some cases a single pair of enantiomorphous stereoisomers is obtained. In particular, when there is a negative substituent next to an asymmetric centre, e.g. an oxo group, it is possible to modify a single or a smaller number of stereoisomeric pairs into a greater number thereof by racemation. Mixtures of more stereoisomeric pairs can be separated for example by fractionated crystallisation or distillation or by the dividing process as is described in Example 6. In addition, single optically active stereoisomers can be obtained by methods known per se, e.g. by conversion of the quaternary ammonium bases into salts of optically active acids, from single stereoisomeric pairs or mixtures of such. If optically active compounds such as e.g. aspartic acid esters, are used as starting compounds, it is also possible in certain circumstances to obtain direct optically active end products.

The following examples further illustrate the performance of the processes according to the present invention.

*Example 1*

1 ccm. of methyl iodide is added to 1 g. of 3-dimethylamino-5-ethyl-tetrahydrofurane (B.P.$_{11}$ 60–62°) in 5 ccm. of abs. ether, wherupon heat is generated and the quaternary salt crystallises out. After standing for two hours, the reaction mixture is refluxed for a few minutes, the precipitate is filtered off under suction and recrystallised from either ethanol/ether or from isopropanol/ether. The metho-iodide of 3-dimethylamino-5-ethyl-tetrahydrofurane is a white salt which easily dissolves in water and melts at 140.5–141°.

On treating the quaternary iodide with silver chloride suspension in water, the very hygroscopic quaternary chloride is obtained in the usual manner. This can only be obtained in crystalline form after careful drying in the high vacuum from ethanol/ether, M.P. 150–151°.

The tetrachloro-aurate of the quaternary base crystallises from water in fine, yellow platelets which melt at 116–117°.

*Example 2*

1.03 g. of 3-dimethylamino-tetrahydrofurane (B.P.$_{80}$ 77–78°, hydrochloride M.P. 138–140°), are dissolved in 5 ccm. of abs. ether and 1 ccm. of methyl iodide is added. The reaction occurs quickly under generation of heat and the N-tetrahydrofuryl-(3)-trimethyl ammonium iodide crystallizes out. After standing for 2 hours and then boiling for a short time under reflux, the quaternary salt is filtered off under suction and recrystallised from ethanol/ether. It is obtained in the form of long prismatic needles which melt at 226–226.5°.

The quaternary chloride can be obtained from the iodide, for example by shaking with a suspension of silver chloride in 50% methanol, filtering and evaporating the methanolic solution. It crystallises from abs. isopropanol/acetone in long, colourless needles which are extremely hygroscopic and water soluble. Melting point 298–299°.

The tetrachloro-aurate is obtained by the addition of chloroauric acid to the aqueous solution of the chloride. It crystallises from 50% methanol in the form of shining platelets which are difficultly soluble. They melt at 228–229° or, after being coloured brown, at 220°.

*Example 3*

0.2 g. of 2.2.5.5-tetra-methyl-3-dimethylamino-tetrahydrofurane (B.P.$_{11}$ 56–57°) are dissolved in 1 ccm. of acetone and 0.09 ccm. of methyl iodide are added. After scratching, the N-[2.2.5.5-tetramethyl-furyl-(3)]-N.N.N-trimethyl ammonium iodide soon begins to crystallise out. It melts at 255°. In an analogous manner, from 1-2.2.5.5-tetramethyl-3-dimethylamino-tetrahydrofurane ($[\alpha]_0^{20}$=—0.722°±0.02° undiluted) 1-N-[2.2.5.5-tetramethyl-furyl - (3)] - N.N.N-trimethyl ammonium iodide (M.P. 160°) and $[\alpha]_0^{20}$=—23.0°±0.5° (c.=10 in water) is obtained with methyl iodide. Also in a similar manner, from d.l-2.2.5.5-tetraethyl-3-dimethylamino-tetrahydrofurane (B.P.$_{11}$ 110–112°), the d.l-N-[2.2.5.5-tetraethyl-tetrahydrofuryl - (3)] - N.N.N-trimethyl ammonium iodide (M.P. 208°) is obtained with methyl iodide, and d.l-N-[2.2.5.5-tetraethyl-tetrahydrofuryl-(3)]-N-benzyl-N.N-dimethyl ammonium chloride (M.P. 181°) is obtained with benzyl chloride and, with dimethyl sulphate, d.l-N-[2.2.5.5-tetraethyl-tetrahydrofuryl-(3)]-N.N.N-trimethyl ammonium methyl sulphate (M.P. 130°) is obtained.

*Example 4*

90 mg. of 3-dimethylamino-5-methyl-tetrahydrofurane are dissolved in 1 ccm. of acetone and 0.5 ccm. of methyl iodide are added. On warming the solution, the N-[5-methyl-tetrahydrofuryl-(3)]-N.N.N-trimethyl ammonium iodide soon precipitates. After recrystallisation from isopropyl alcohol it melts at 128–132°. In an analogous manner with allyl bromide, N-[5-methyl-tetrahydrofuryl-(3)]-N-allyl-N.N-dimethyl ammonium bromide (M.P. 126–128° from acetone/methanol) is obtained; from 3-diethylamino-tetrahydrofurane (B.P.$_{10}$ 62–63°) N-tetrahydrofuryl-(3)-N-methyl-N.N-diethylammonium iodide (M.P. 168–171°) is obtained; from 3-dimethylamino-5-phenyl-tetrahydrofurane (B.P.$_{10}$ 134.5–136.5°) N-[5-phenyl-tetrahydrofuryl-(3)]-N.N.N-trimethyl ammonium iodide (M.P. 116–120°) is obtained; from 3-dimethylamino-5-bromovinyl-tetrahydrofurane (B.P.$_{0.15}$ 60–62°) N - [5 - bromovinyl - tetrahydrofuryl - (3)] - N.N.N-trimethyl ammonium iodide (M.P. 135–146°) is obtained; from 3-piperidino-tetrahydrofurane (B.P.$_{10}$ 93–95°) N-tetrahydrofuryl-(3)-N-methyl-piperidinium iodide (M.P. 139–144°) is obtained; from 2-ethyl-3-dimethylamino-tetrahydrofurane (B.P.$_{10}$ 52–53°) N-[2-ethyl-tetrahydrofuryl-(3)]-N.N.N-trimethyl ammonium iodide (M.P. 112–116°) is obtained; from 2.5-dimethyl-3-dimethylamino-tetrahydrofurane (B.P.$_{12}$ 48–51°) N-[2.5-dimethyl-tetrahydrofuryl - (3)] - N.N.N - trimethyl ammonium iodide (M.P. 162–164° from methanol/ethyl acetate) is obtained; from 3-(N-methyl-N-n-butylamino)-tetrahydrofurane (B.P.$_{0.04}$ 84–85°) N-tetrahydrofuryl-(3)-N-n-butyl-N.N-dimethyl ammonium iodide (M.P. 144–146° from acetone/isopropyl alcohol) is obtained; from 3-N-methylbenzylamino-tetrahydrofurane (B.P.$_{0.01}$ 84–85°) N-tetrahydrofuryl-(3)-N-benzyl-N.N-dimethyl ammonium iodide (M.P. 164–167°) is obtained; and from 3-morpholino-tetrahydrofurane (B.P.$_{10}$ 99–100°) N-tetrahydrofuryl-(3)-N-methyl-morpholinium iodide (M.P. 134–136°) is obtained.

*Example 5*

2.03 g. of d.l-2.5-dimethyl-2.5-dihydroxy-3-dimethylaminohexane, a water-coloured viscous oil (B.P.$_{0.0025}$ 60–65°) are dissolved in 10 ccm. of acetone and 0.67 ccm. of methyl iodide are added. d.l-N[2′.5′-dihydroxyhexyl-(3′)]-N.N.N-trimethyl ammonium iodide immediately crystallises out. It melts at 293°. 0.165 g. of this quaternary ammonium iodide are dissolved in 5 ccm. of water and the solution obtained is poured very slowly through a column containing 1 g. Amberlite IR–120 (H form). The column is then washed out with water until the run-off has a neutral reaction. 5 ccm. of 1-N-sulphuric acid are then run through the column and the column is again washed out with water until the run-off has a neutral reaction. The sulphuric acid eluate is then evaporated in the vacuum until it has a syrupy consistency, 1 ccm. of 33% sulphuric acid is then added and the whole is heated for 2 hours at 95°. The pale brown reaction mixture is diluted to 20 ccm. with water, filtered very slowly over a column containing 9 g. of Amberlite IR–IV–B (OH form) and the column is washed out with distilled water until the run-off has a neutral reaction. The eluate is made weakly acid to litmus paper with 0.1 N-hydriodic acid and the whole is evaporated to dryness in the vacuum. The residue crystallises immediately and is rubbed 4 times with acetone. The d.l-N-[2.2.5.5-tetramethyl-tetrahydrofuryl-(3)]-N.N-N-trimethyl ammonium iodide so obtained melts at 249°; the melting point of this substance mixed with that obtained according to Example 3 is no lower.

*Example 6*

(a) A mixture of 51.9 g. of furane-3-carboxylic acid methyl ester and 45 ccm. of acetic anhydride is heated to 50° in a four-necked flask fitted with a stirrer, dropping funnel, reflux condenser and a thermometer. 5.5 g. of boron trifluoride-diethyl ether complex are then added and the whole is heated to 95°. The heating is removed when this temperature is attained. The inner temperature continues to rise slowly and finally reaches about 105° whereupon it begins to drop. When the reaction mixture has cooled of its own accord to room temperature it is further cooled with ice and then it is decomposed with ice water and ether. The ethereal layer is removed, washed with sodium bicarbonate solution dried over magnesium sulphate and the ether is distilled off. The 5-acetyl-furane-3-carboxylic acid methyl ester can be obtained from the brown residue which slowly crystallises, by distillation in the vacuum, chromatography or extraction with solvents. It passes over at 128–129° under 11 mm. pressure and crystallises in the receiver. The melting point of the distilled product is 86–87.5°; after recrystallising twice from acetone/petroleum ether, it rises to 88.5–89°.

(b) 6 g. of a palladium hydroxide-barium sulphate catalyst with 5% palladium content are hydrogenated to saturation in 270 ccm. of a mixture of ethanol (fine spirit)/ethyl acetate (1:1). A solution of 31.3 g. of 5-acetyl-furane-3-carboxylic acid methyl ester in the same solvent mixture is then added and the whole is hydrogenated at room temperature at slight excess pressure until no more hydrogen is taken up. The catalyst is then filtered off, the solvent mixture is distilled off over a column and the residue is fractionated in the vacuum through a 5 cm. high Vigreux column. The main fraction passes over at 115–130° under 11–12 mm. pressure. It is again distilled whereupon a thick liquid main fraction is obtained which boils at 120–126°. It is a mixture of stereoisomeric 5-(α-hydroxy-ethyl)-tetrahydrofurane-3-carboxylic acid methyl esters.

Heat is clearly generated on hydrogenation. With the above catalyst, the amount of hydrogen taken up is about 2.9 mols. There are hydrogenolysis products of the furane ring and of the acetyl group in the previous fractions, but, corresponding to the high methoxyl content of all fractions, there are no lactones.

(c) 18.0 g. of 5-(α-hydroxy-ethyl) tetrahydrofurane-3-carboxylic acid methyl ester (isomeric mixture) are dissolved in 25 ccm. of abs. ethanol and then 5.18 g. of hydrazine hydrate are added. Heat is generated spontaneously during the addition; the reaction is completed by boiling under reflux for one hour. After evaporation off of the solvent in the vacuum, the crude, very hygroscopic 5-(α-hydroxy-ethyl)-tetrahydrofurane-3-carboxylic acid hydrazide is obtained. It can be distilled in small amounts in the vacuum. It boils at about 130° under 0.02 mm. pressure (air bath).

The crude hydrazide is dissolved in 55 ccm. of 2 N-hydrochloric acid and covered with a layer of 50 ccm. of ether. An aqueous solution of 7.8 g. of sodium nitrite is added while cooling with ice and stirring well. The ethereal layer is separated and small particles of solid carbon dioxide are added. The aqueous phase is then extracted with ether eight times while stirring and cooling with ice. The combined ether extracts are washed with a little concentrated sodium chloride solution and quickly dried over magnesium sulphate. The volume is then reduced by evaporation in the vacuum to a quarter of that of the original, 60 ccm. of benzene are added and the volume is again reduced to one third. Benzene is added to the still somewhat cloudy solution and it is again evaporated in the vacuum until a completely clear, anhydrous solution is obtained. 20 g. of benzyl alcohol are then added and the whole is heated slowly on a water bath. Vigorous decomposition takes place at about 55°. It is kept at this temperature until the generation of nitrogen has been completed and then refluxed for 3 hours. The solvent and the excess benzyl alcohol are removed in the vacuum and the remaining 3-carbobenzyloxyamino-5-(α-hydroxy-ethyl)-tetrahydrofurane is split with hydrochloric acid, 100 ccm. of 2 N-hydrochloric acid being added to the residue which is then heated for 2 hours on a water bath. After cooling, the neutral portion are extracted with ether and the ether extracts are again split by boiling under reflux with 50 ccm. of 2 N-hydrochloric acid. The hydrolysis is repeated as long as neutral portions can be modified into amine-hydrochloride. The combined hydrochloric acid solutions are shaken out with a little ether and then evaporated in the vacuum. The crude hydrochloride mixture of stereoisomeric 3-amino-5-(α-hydroxyethyl)-tetrahydrofuranes so obtained is converted into a mixture of stereoisomeric bases by dissolving the hydrochloride mixture in a few ccm. of water and then adding enough pulverised potassium hydroxide to make a powder. This is extracted with a lot of ether first while boiling under reflux and finally with boiling tetrahydrofurane. The oil which remains on evaporation of these extracts is distilled under 10 mm. pressure at 120° air bath temperature whereupon a considerable part of the crude product remains in a resinified form. The mixture of the free bases is a very hygroscopic, colourless oil which has a strong basic smell.

(d) A mixture of 3.6 g. of 35% aqueous formaldehyde solution and 4.4 g. of anhydrous formic acid are added under ice cooling to 2.50 g. of the above mixture of stereoisomeric bases and, after standing for some time at room temperature, the whole is heated in a water bath. Finally it is refluxed in an oil bath at 135° bath temperature and then the formaldehyde solution and the formic acid are evaporated off. The residue is taken up in a little water, excess 2 N-sodium hydroxide solution is added, it is heated to saponify any formic acid esters which may have been formed and then extracted with chloroform five times in a separating funnel. After evaporation of the washed and dried chloroform extracts, the crude mixture of the stereoisomeric 3-dimethylamino-5-(α-hydroxyethyl)-tetrahydrofurane remains as a pale brown oil.

(e) The crude mixture of tertiary bases obtained above is dissolved in 20 ccm. of abs. ether and then left to stand for about 14 hours with 2 ccm. of methyl iodide. The reaction mixture is then refluxed for 2 hours and the ether is decanted from the mixture of stereoisomeric quaternary iodides which have separated out. This mixture is converted by shaking with an aqueous silver chloride suspension into the corresponding mixture of stereoisomeric N-[5-(α-hydroxy-ethyl)-tetrahydrofuryl-(3)]-N.N.N-trimethyl ammonium chlorides. After evaporation of the aqueous solution and drying of the residue in a high vacuum, the quaternary chloride mixture crystallises. On recrystallisation from isopropanol/acetone clusters of fine little needles are obtained which melt at 149–150° and, after further recrystallisation at 154–155°. They are extremely hygroscopic.

On fractional crystallisation of the mixture of the tetrachloro-aurates, two crystal fractions having a different melting point but the same empirical molecular formula can be obtained. To do this, a 20% solution of tetrachloroauric acid in 1 N-hydrochloric acid is added to the mixture of quaternary chlorides and a crystal fraction is separated by rubbing and ice cooling. This fraction, after again recrystallising from a little water, produces a tetrachloroaurate which crystallises in platelets. M.P. 100–103° (sinter from 97°). A tetrachloroaurate separates from the recrystallisation mother lye which has been left to stand, in large thick prismatic blocks which melt at 136–139°. The pure isomers which melt at 114.5–115° and 151–152.5° are obtained by further fractionated recrystallisation.

However, also the stereoisomeric quaternary ammonium chlorides can be separated as such through a cellulose column by means of a mixture of acetic acid/butanol/water. The melting point of the more easily eluted chloride is 150–151°, that of the more difficultly eluted chloride at 175.5–176°.

(f) 106.8 mg. of N-[5-(α-hydroxy-ethyl)-tetrahydrofuryl-(3)]-N.N.N-trimethyl ammonium chloride (M.P. 175.7–176°) are dissolved in 5 ccm. of methanol, 0.32 ccm. of methyl iodide and 1.3 g. of silver oxide are added and the whole is then refluxed for 3 hours. After this time the same amounts of methyl iodide and silver oxide are added and the reaction mixture is refluxed for a further hour. After cooling, the reaction mixture is filtered, the filtrate is condensed, acidified with 0.1 N-hydrochloric acid and evaporated to dryness. Both methylated and unmethylated bases are present in the residue. They can be separated from a mixture of N-butanol/ethanol/ammonia/water through a cellulose column (78 g.). N-[5-(α-methoxy-ethyl)-tetrahydrofuryl-(3)]-N.N.N-trimethyl ammonium hydroxide is obtained as a colourless, hygroscopic lacquer. The tetrachloroaurate crystallises from water into leaflets which melt at 84.5–86°.

In the same way, the stereoisomeric N-[5-(α-hydroxyethyl)-tetrahydrofuryl-(3)]-N.N.N-trimethyl ammonium chloride (M.P. 150–151°) can be converted into its methyl ether and then modified into the corresponding pure base. The tetrachloroaurate of the latter crystallises from water in fine leaflets which melt at 78–80°.

*Example 7*

18.3 g. of distilled dimethyl formamide and 4.6 g. of formic acid (anhydrous) are heated while stirring in an oil bath, the temperature of which is 160°. 17 g. of 2.5-dimethyl-2.5-diethyl-tetrahydrofuranone-(3) in 15 g. of formic acid are added dropwise within 20 minutes. After the bath temperature has risen to 180° carbon dioxide begins to develop. The bath is kept at this temperature for about 14 hours. After cooling to about 100°, 30 ccm. of hydrochloric acid, diluted 1:1, are added to the reaction mixture and the whole is heated for 3 hours at 130° to hydrolyse the excess dimethyl formamide. The acid solution is allowed to cool and then shaken out with ether to remove unreacted 2.5-dimethyl-2.5-diethyl-tetrahydrofuranone-(3). The acid solution is then made phenolphthalein alkaline with 50% caustic soda lye and ethered out. The ether extract, after washing with concentrated sodium chloride solution, is dried over sodium sulphate and evaporated whereupon the crude 2.5-dimethyl-2.5-diethyl-3-dimethylamino-tetrahydrofurane remains as a pale brown liquid which has a basic smell.

The crude tertiary base is dissolved in ether and excess methyl iodide is added. The N-[2.5-dimethyl-2.5-diethyl-tetrahydrofuryl-(3)]-N.N.N-trimethyl ammonium iodide which precipitates is recrystallised from isopropanol/ether. It is obtained in the form of pale yellowish little needles which melt at 172–174°.

*Example 8*

15.1 g. of 3-bromo-tetrahydrofurane are heated in an autoclave at 120–130° for 8 hours with 135 g. of a 15% solution of trimethylamine in benzene. On completion of the reaction, the product which has crystallised out is filtered off, washed several times with benzene and then recrystallised from a mixture of isopropyl alcohol/acetone. The very hygroscopic tetrahydro-furyl-(3)-trimethyl ammonium bromide melts in a vacuum tube at 249–251° on decomposition.

*Example 9*

(a) 14.4 g. of 1.1-diethoxy-3-butane, produced from allyl magnesium bromide and ortho-formic acid ethyl ester, are dissolved in 30 ccm. of 90% acetic acid and a solution of 14.4 g. of bromine in 12 ccm. of 90% acetic acid is added dropwise under ice cooling while stirring. Carbon tetrachloride for example can be used as solvent instead of acetic acid. The 1.1-diethoxy-3.4-dibromobutane decomposes on heating to over about 70°. It can be distilled however, at lower temperatures; it passes over at a bath temperature of 60–65° under 0.01 mm. pressure.

(b) The acetic acid solution of the dibromacetal obtained according to (a) can be further used direct. 20 ccm. of 27% sulphuric acid are added, the air is replaced by nitrogen and the whole is stirred in a closed flask for two to three hours at room temperature. 140 ccm. of potassium bicarbonate solution, saturated at room temperature, is added dropwise while continuously stirring to the now ice cooled reaction solution, whereupon a heavy yellowish oil, the main part of which consists of 3.4-dibromo-butyraldehyde, separates. This oil cannot be distilled but can be identified by conversion into its 2.4-dinitro-phenyl-hydrazone which melts at 170–173° under decomposition.

(c) The crude aldehyde obtained according to (b) is stirred for about 10–15 minutes with 30 ccm. of a saturated sodium bisulphite solution whereupon the sodium bisulphite addition compound thereof separates in crystalline form. This is filtered off, washed with a little ice cold water twice and then with ether and is dried by spreading it on an earthenware plate for about 20 minutes.

(d) 16 g. of the above addition compound are suspended in 50 ccm. of water and a solution of 5.9 g. of potassium cyanide in 20 ccm. of water is added while stirring and ice cooling. After stirring for two hours at room temperature, again 5.9 g. of potassium cyanide in 15 ccm. of water are added and the mixture is shaken overnight in a nitrogen atmosphere after which it is allowed to stand for two more days at room temperature.

The reaction solution is then saturated with sodium chloride and ethered out. The ether extracts are washed first with acidified and then with neutral saturated sodium chloride solutions, dried over sodium sulphate and concentrated. The residue is distilled in a high vacuum. The 3-bromo-5-cyano-tetrahydrofurane passes over at 44–46° under 0.0005 mm. pressure.

(e) A solution of 3.2 g. of the above cyano compound in 15 ccm. of abs. ether is added dropwise while stirring and ice cooling to a solution of about 3.3 g. of methyl magnesium iodide in 35 ccm. of abs. ether. The whole is stirred for 4–5 hours at room temperature and then refluxed for 3–4 hours. A few ccm. of water and then 5 N-hydrochloric acid are added to the reaction mixture under ice cooling to decompose it, whereupon two clear liquid phases are obtained which are saturated with sodium chloride and then extracted with ether. The ether extract is dried over sodium sulphate and evaporated; a brown viscous oil remains. From this, crude 3-bromo-5-acetyl-tetrahydrofurane and a 2.4-dinitrophenyl hydrazone are obtained. The latter melts at 172–176° on decomposition.

(f) The crude bromine ketone obtained above is dissolved in about 20 ccm. of abs. ether and the solution is added dropwise to a solution of 0.6 g. of lithium aluminium hydride in 15 ccm. of abs. ether while stirring and ice cooling. After stirring for 2 hours at room temperature, the reaction mixture is decomposed with water and diluted hydrochloric acid is added until two clear, liquid phases are obtained. After saturating these with sodium chloride, they are ethered out, the ether extract is dried over sodium sulphate, the ether is evaporated off and the residue is distilled in a high vacuum. The mixture of stereoisomeric 3-bromo-5-($\alpha$-hydroxy-ethyl)-tetrahydrofuranes passes over at 56–58° under 0.003 mm. pressure.

(g) 2 g. of the above reduction product are dissolved in 15 ccm. of abs. benzene, 3.7 ccm. of dimethylamine are added and the whole is heated for 25 hours in a bomb tube at 80–90°. The reaction mixture is then poured into diluted acid, the benzene layer is separated off, the aqueous phase is saturated with potassium carbonate and thoroughly extracted with ether. The ether extract is dried over potassium carbonate and concentrated. The residue is distilled in a bulb tube. The mixture of isomeric 3-dimethyl-amino-5-($\alpha$-hydroxy-ethyl)-tetrahydrofuranes boils at 60–65° under 0.01 mm. pressure.

Instead of benzene, the same amount of methanol or acetone can be used as solvent. In this case stereoisomeric mixtures of somewhat different composition are obtained.

(h) The tertiary amines produced according to the above paragraph can also be obtained for example in the following manner:

0.5 g. of 1,4-dihydroxy-2-dimethylamino-5-benzyloxy-hexane (B.P.$_{0.001}$ 132°) is dissolved in 1 ccm. of 66% by volume sulphuric acid and the whole is heated for 2 hours at 95°. This compound is produced, e.g. by condensing 3-benzyloxybutane-1.2-epoxide (B.P.$_{0.01}$ 80°) with acetoacetic acid ethyl ester, reacting the $\alpha$-acetyl-$\delta$-benzyloxy-$\gamma$-caprolactone obtained (B.P.$_{0.002}$ 156°) with benzene diazonium chloride to form the phenyl hydrazone of $\alpha$-oxo-$\delta$-benzyloxy-$\gamma$-caprolactone (M.P. 170°), reducing this with zinc and formic acid to $\alpha$-formylamino-$\delta$-benzyloxy-$\gamma$-caprolactone, methylating direct with formaldehyde and formic acid to $\alpha$-dimethylamino-$\delta$-benzyloxy-$\gamma$-caprolactone (B.P.$_{0.003}$ 160°) and reducing the latter by means of sodium borohydride. After cooling, a little ice is added to the reaction solution, it is neutralised with potassium carbonate and extracted several times with ether. On evaporating off the ether, a mixture of stereoisomeric 3-dimethylamino - 5 - ($\alpha$-hydroxy-ethyl)-tetrahydrofuranes remains. The same product is obtained if, instead of sulphuric acid, 5 ccm. of 4% hydrobromic acid is used as condensing agent, the reaction solution is heated for 2 hours at 125° and then the product is worked up as described above.

(i) 1 g. of the mixture of stereoisomeric 3-dimethylamino-5-($\alpha$-hydroxy-ethyl)-tetrahydrofuranes obtained according to (g) is dissolved in 5 ccm. of abs. ether, 1 g. of methyl iodide is added and the whole is left to stand for 2 hours. The ether is then decanted, the residue is dissolved in 4 ccm. of aqueous methanol and silver chloride is added to the solution. The silver chloride is prepared fresh from 2.4 g. of silver nitrate. The reaction mixture is shaken for 2 hours at room temperature, filtered and dried in a stream of nitrogen at 50–60°. The residue is dissolved in about 1 ccm. of abs. isopropanol and poured into a solution of abs. acetone. After standing some time, the mixture of the stereoisomeric N-[5-($\alpha$-hydroxy - ethyl)-tetrahydrofuryl-(3)]-N.N.N - trimethyl ammonium chlorides crystallises with a quarter of a mol crystal water. It melts while foaming in an evacuated tube at 162–163°.

*Example 10*

0.6 g. of the 3-bromo-5-($\alpha$-hydroxy-ethyl)-tetrahydrofurane obtained according to Example 9(f), are dissolved in 3 ccm. of abs. methanol, 1.5 ccm. of trimethylamine are added and the whole is heated in a tube sealed by melting for 20 hours at 60°. The volatile portions are then removed in a nitrogen atmosphere at 50–50°, ether is added to the residue and, after leaving to stand for some time, the ether is decanted from the precipitated viscous oil. This oil is the bromide of N-[5-($\alpha$-hydroxyethyl)-tetrahydrofuryl-(3)]-N.N.N-trimethyl ammonium base from which the quaternary chloride is obtained as described at the end of Example 9.

*Example 11*

(a) As little ethereal allyl bromide solution is added to 10.1 g. of magnesium filings in 350 ccm. of abs. ether as is necessary to bring about a noticeable reaction. A solution of 31 g. of allyl bromide and 19 g. of benzyloxyacetaldehyde (produced in the known way by oxidation of glycerine-$\alpha$-benzyl ether with lead tetra-acetate or periodic acid) is added dropwise within 3 hours and the whole is then stirred for about 14 hours at room temperature. The reaction mixture is then poured onto cold, excess 10% ammonium chloride solution, the ethereal phase is separated, washed once with first ammonium chloride solution, then water and finally with sodium chloride solution and dried over sodium sulphate. After evaporating off the ether, the residue is distilled in a high vacuum. Benzyloxymethyl-allyl carbinol passes over at 82–85° under 0.005 mm. pressure.

(b) A solution of 30 g. of bromine in 50 ccm. of carbon tetrachloride is added dropwise while stirring at −10 to −5° to a solution of 36 g. of benzyloxymethyl-allyl carbinol in 100 ccm. of carbon tetrachloride whereupon the bromine is immediately added. The whole is stirred for 15 hours at room temperature and then 42 g. of pulverised potassium hydroxide are added in portions while stirring whereupon the temperature rises to about 55°. On completion of the addition, the reaction mixture is stirred for about another hour, the temperature is brought to 0° and ice water is added, the organic phase is separated, washed with water and dried over sodium sulphate. After evaporating off the carbon tetrachloride in the vacuum, the residue is distilled in a high vacuum. 3-bromo-5-benzyloxymethyl-tetrahydrofurane passes over at 111–118° under 0.005 mm. pressure.

(c) 26 g. of 3-bromo-5-benzyloxymethyl-tetrahydrofurane and 60 ccm. of 20% methanolic dimethylamine solution are heated for 12 hours at 70–80° in a tube sealed by melting. The solvent is evaporated, the residue is taken up in ice cold 2 N-hydrochloric acid and repeatedly shaken with ether. On further working up the hydrochloric acid solution in a manner analogous to that described in Example 7, 3-dimethylamino-5-benzyloxymethyl-tetrahydrofurane is obtained. B.P. 98–99° under 0.004 mm. pressure.

(d) The above compound can also be obtained by dissolving 6.4 g. of 1.4-dihydroxy-2-dimethylamino-5-benzyloxy pentane in 128 g. of abs. pyridine, adding 3.84 ccm. of methane sulphochloride at about 0° and heating for 12 hours at 115°. The product is isolated by evaporating off the pyridine in the vacuum, adding ice to the residue and saturating it with potassium carbonate. The base which separates is taken up in ether, the ethereal solution is dried over potassium carbonate and evaporated.

(e) 20 g. of 3-dimethylamino-5-benzyloxymethyl-tetrahydrofurane obtained according to (c) or (d) are dissolved in 950 ccm. of 75% ethanol, 110 ccm. of 1 N-hydrochloric acid and 10 g. of palladium charcoal are added and the whole is hydrogenated at room temperature with hydrogen of 100 atm. pressure. The catalyst is then filtered off, the solvent is distilled off at 40–45° in the vacuum, the residue is dissolved in 20 ccm. of water, 100 ccm. of concentrated caustic soda lye are added and the solution is extracted with ether for about 15 hours in the Kutscher-Steudel apparatus. The ethereal solution is dried over sodium sulphate and evaporated. The residue is distilled in the vacuum whereupon 3-dimethylamino-5-hydroxymethyl-tetrahydrofurane is obtained, B.P.$_{11}$ 112–120°.

On treating the tertiary base with the same amount of acetic anhydride while slightly warming, distilling off the acetanhydride in the vacuum at 50–60°, taking up the residue in sodium bicarbonate solution, repeated extraction thereof with ether, concentrating the ether extracts and distilling the residue in a high vacuum, the acetic acid ester of the tertiary base is obtained. B.P. $_{0.003}$ 62–64°.

The tertiary base also produces a perchlorate, which after recrystallisation from methanol/ethyl acetate, melts at 78–81°.

(f) The tertiary base above mentioned can also be obtained e.g. by reacting 1.4-dihydroxy-2-dimethylamino-5-benzyloxy-pentane (B.P.$_{0.02}$ 141°) in a manner analogous to Example 9(f) with 66% by volume of sulphuric acid or with 48% hydrobromic acid. 1.4-dihydroxy-2-dimethylamino-5-benzyloxy-pentane can be obtained analogously to the reaction described in Example 9(f) starting from benzyl glycide ether by way of α-acetyl-δ-benzyloxy-γ-valerolactone (B.P.$_{0.001}$ 152°), phenyl hydrazone of α-oxo-δ-benzyloxy-γ-valerolactone (M.P. 169°), α-formyl-amino-δ-benzyloxy-γ-valerolactone and α-dimethylamino-δ-benzyloxy-γ-valerolactone (B.P.$_{0.05}$ 155°).

(g) 1 g. of 3-dimethylamino-5-hydroxymethyl-tetrahydrofurane is dissolved in 5 ccm. of acetone, 1 ccm. of methyl iodide is added whereupon heat is generated. The reaction is left to stand for about 4 hours, the excess methyl iodide and solvent are evaporated off and the oily residue is dried in the high vacuum. The N-[5-hydroxy-methyl-tetrahydrofuryl-(3)]-N.N.N-trimethyl ammonium iodide which does not crystallise is distinguished by shaking it with the same amount of acetic anhydride for 1 hour while occasionally gently warming. The acetic acid and excess acetic anhydride are evaporated off in the vacuum at 50–60° and the residue is dried in the high vacuum. After recrystallising twice from methanol/ethyl acetate, the N-[5-acetoxy-methyl-tetrahydrofuryl-(3)]-N.N.N-trimethyl ammonium iodide obtained melts at 177–180°.

The neurophysiological activity of the quaternary ammonium compounds of the tetrahydrofurane series according to the present invention is shown, in particular, by a strong vasodilation. This action occurs on parenteral, in particular on intravenous application, as well as also on peroral application and can be made use of in the treatment of hypertension and other diseases of the circulation.

What we claim is:

1. A compound corresponding to the formula:

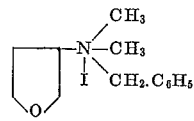

2. A compound corresponding to the formula:

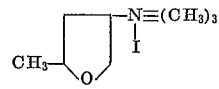

3. The compound corresponding to the formula:

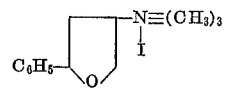

4. The compound corresponding to the formula:

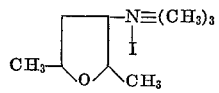

5. N-[5-hydroxy-methyl-tetrahydrofuryl-(3)]-N.N.N-trimethyl ammonium iodide.

References Cited in the file of this patent

UNITED STATES PATENTS

| | | |
|---|---|---|
| 2,185,220 | Nabenhauer | Jan. 2, 1940 |
| 2,278,202 | Lange | Mar. 31, 1942 |
| 2,618,638 | Craig | Nov. 18, 1952 |

OTHER REFERENCES

Beilstein: Vol. 17–19, first suppl., page 554 (1934).
Beilstein: Vol. 18, second suppl., page 146 (1952).